United States Patent [19]

Strickberger

[11] Patent Number: 5,372,183
[45] Date of Patent: Dec. 13, 1994

[54] THERMAL CONTROL ARRANGEMENTS FOR A GEOSYNCHRONOUS SPACECRAFT

[76] Inventor: Harold P. Strickberger, 522 Heritage Oak Dr., Yardley, Pa. 19067

[21] Appl. No.: 748,609
[22] Filed: Aug. 22, 1991
[51] Int. Cl.[5] .................. F28D 15/00; G05D 23/00
[52] U.S. Cl. ................................. 165/41; 165/904; 244/158 R; 244/163
[58] Field of Search .................. 165/41, 904, 133; 244/158 R, 158 A, 163

[56] References Cited

U.S. PATENT DOCUMENTS

| | | | |
|---|---|---|---|
| 3,205,937 | 9/1965 | Shyffer | 165/904 |
| 3,422,636 | 1/1969 | Fuschillo et al. | 165/904 |
| 3,548,930 | 12/1970 | Byrd | 165/105 |
| 3,603,530 | 9/1971 | Easton et al. | 244/1 SC |
| 3,671,286 | 6/1972 | Fischell | 117/333 |
| 3,744,478 | 7/1973 | Gopin | 126/270 |
| 3,749,156 | 7/1973 | Fletcher et al. | 165/32 |
| 4,009,851 | 3/1977 | Cable | 244/158 |
| 4,161,212 | 7/1979 | Hightower | 165/96 |
| 4,162,701 | 7/1979 | Ollendorf | 165/32 |
| 4,603,731 | 8/1986 | Olsen | 165/41 |
| 4,669,685 | 6/1987 | Dalby | 244/158 R |
| 4,682,744 | 7/1987 | Gounder | 244/158 R |
| 4,687,048 | 8/1967 | Edelstein et al. | 165/1 |
| 4,706,740 | 11/1987 | Mahefkey | 164/104.14 |
| 4,738,304 | 4/1988 | Chalmers et al. | 165/13 |
| 4,830,097 | 5/1989 | Tanzer | 165/41 |
| 4,880,050 | 11/1989 | Nakamura et al. | 165/41 |
| 5,036,905 | 8/1991 | Eninger et al. | 244/158 R |
| 5,069,274 | 12/1991 | Haslett et al. | 244/163 |

FOREIGN PATENT DOCUMENTS

| | | | |
|---|---|---|---|
| 808839 | 3/1969 | Canada | 244/163 |
| 2452078 | 11/1980 | France | 244/163 |
| 3718873 | 11/1988 | Germany | 244/163 |

OTHER PUBLICATIONS

GE AstroSpace Telstar 4 Spacecraft Description Sheet. This sheet become available no earlier than Oct. 1990.
GE AstroSpace Satcom C-1 Spacecraft Descriptive Sheet. No date.
GE Proposal Document, Telstar 4 Satellite, pp. 2-125 to 2-134 of vol. 2, Oct. 1988.
GE Proposal Document, Telstar 4 Satellite, pp. 3.5-1 to 3.5-5, 3.5-15 to 3.5-22 and 3.5-30 to 3.5-32 of vol. 3, Book 2, Oct. 1988.
GE Proposal Document, GE American Communications SATCOM H1 Satellite, vol. 2, pp. 9.1-1 to 9.1-6, 9.6-1 to 9.6-6, and 9.8-5 to 9.8-6, issued 17 Sep. 1990.
Technical Handbook AED M-2170, Section IX, Thermal Control, "Programming and Control Handbook for RCA Satcom Spacecraft," pp. IX-1 through IX-19 (circa Mar. 1975).
The Missions Operations Plan RCA Americom handbook, AED R-4117F, pp. 3-5 through 3-15, issued Nov. 17, 1975.
"RCA SATCOM 1 & 2 Flight History and End-of-Life Testing" article, pp. 1-6 and The Life and Times of SATCOMS 1 and 2, pp. 1-3, 19 and 20, AIAA-86-0708-CP (circa Sep. 1986).
Telesat ANIK-B Communications Satellite Spacecraft Operations Manual, issued Jun. 2, 1978, Section VII.A., Thermal Control, pp. VII-1, -3, -10, and II-11.
"The Effects of Electrostatic Discharge Phenomena on Telesat's Domestic Communications Satellites," by P. N. Wadham, No. 87-TE-008, pp. 25-1 through 25-9, Jun. 1986.

*Primary Examiner*—John Rivell
*Assistant Examiner*—L. R. Leo
*Attorney, Agent, or Firm*—Clement A. Berard, Jr.

[57] ABSTRACT

A spacecraft adapted for operation in a low inclination angle earth orbit comprises north, south, east and west panels defining a spacecraft interior volume. The north and south panels are oppositely disposed with respect to each other and the east and west panels are oppositely disposed with respect to each other. The spacecraft interior volume generally and preferably lacks structural elements that substantially restrict thermal radiation among the panels. The north and south panels, to which spacecraft equipment is usually mounted, each include conductive heat pipes for reducing the temperature differences across each panel. The exterior surfaces of the north, south, east and west panels have a covering, preferably of optical solar reflectors (OSRs), for radiating thermal energy therefrom, wherein the OSRs have a solar absorptivity that is substantially less than their thermal emissivity. The interior surfaces of the north, south, east and west panels have a covering for effectively radiating thermal energy between and among the panels across the interior volume.

16 Claims, 2 Drawing Sheets

THERMAL CONTROL ARRANGEMENTS FOR A GEOSYNCHRONOUS SPACECRAFT

The present invention relates to thermal control arrangements for spacecraft and, in particular, for spacecraft intended for certain generally equatorial orbits.

A spacecraft in space would be subject to a wide range of temperature conditions if it were not for various arrangements of thermally controlling devices operating cooperatively to control the flow of heat from the sources thereof within the spacecraft, and the various heat gains and heat losses. Heat is lost from a spacecraft by its being radiated into space and heat is gained by a spacecraft from input from the sun. Solar energy produces temperature rise in two ways. Principally, solar energy impinging upon the spacecraft is absorbed to some degree and produces direct heating. Secondarily, the electrical energy produced by the solar cell arrays as a result of solar energy impinging thereon is utilized by the various equipment on a spacecraft and is thereby generally converted to heat energy. It is noted that the spacecraft equipment would similarly produce heat energy to be dissipated if the electrical energy were produced by an alternative source, such as a battery, a fuel cell or a nuclear-powered generator.

Various arrangements have been developed in the prior art to address the foregoing need for a thermal control and management system for spacecraft. One arrangement employs all sides of the spacecraft as a thermal radiator and includes an arrangement of highly thermally conductive paths for transferring heat from the location where it is generated to the cooler side of the spacecraft, as well as from the hotter portions of the body to the cooler portions thereof. Once such arrangement is disclosed in U.S. Pat. No. 4,880,050 (Nakamura et al.) which describes a thermal management system wherein a plurality of T-shaped pallets each have a radiator panel and a mounting panel thermally coupled by L-shaped external heat pipes. Each mounting panel is coupled via L-shaped internal heat pipes to a closed-loop heat pipe by which they are thermally coupled to each other. The heat then is transferred to the radiator panels facing away from the sun via the closed-loop heat pipe, the internal heat pipes, the mounting panels, and the external heat pipes. It is submitted that the Nakamura et al. arrangement is extremely complex and expensive, and requires an elaborate network of heat pipes which have a significant mass thereby reducing the mass available in the spacecraft to be devoted to a useful payload. It is further submitted that this arrangement may be more suitable to a spacecraft that is spinning at a sufficiently high rate that the effect of thermal energy input from the sun tends to be averaged over the surface of the spacecraft due to such rotation.

A different arrangement is disclosed in the prior art in relation to spacecrafts that are not spinning. Consider, for example, an earth-orbiting spacecraft generally in the shape of a rectangular solid having six surfaces usually referred to as panels. Generally, the spacecraft is oriented with respect to the earth so that one surface faces the earth and is generally referred to as the earth-facing panel or nadir panel. The surface opposite the earth-facing panel is generally referred to as an anti-earth or anti-nadir panel because it always faces away from the earth. In a generally equatorial orbit, i.e. that of relatively low inclination with respect to the equatorial plane, the earth-facing and anti-earth panels are perpendicular to the orbital plane and to a radius of the orbit. Two other surfaces of the spacecraft are oriented perpendicular to the orbital plane and opposite each other on the spacecraft; one faces in the direction of spacecraft travel and the other faces away from that direction, and are generally referred to as the east panel and the west panel, respectively. These panels are generally oriented perpendicular to the orbital plane as well as to the velocity vector of the spacecraft, which is generally tangential to the orbit. The remaining two surfaces of the spacecraft are oriented parallel to the orbital plane and are generally referred to as the north panel and south panel, in correspondence to the poles of the body about which the spacecraft is orbiting, here the earth.

Each time the spacecraft makes an orbit about the earth the sun illuminates the east panel, then the anti-earth facing panel, then the west panel, and then the earth facing panel. Each panel is so illuminated for approximately one-third of the orbit, there being two panels illuminated at any given time. Thus, each of these panels is a source of solar heating of the spacecraft. It should be pointed out that if the spacecraft is in a relatively low orbit, say between 100 and 1,000 miles above the earth's surface, there is a substantial eclipse period in each orbit during which there is no solar illumination of the spacecraft. As a result, the earth-facing panel receives much less solar energy input than do the other panels. On the other hand, the earth-facing panel is able to radiate a relatively lesser amount of thermal energy away from the spacecraft because the thermal temperature of the earth is relatively high as compared to that of space. The east, west, and anti-earth facing panels can radiate substantial amounts of thermal energy when facing away from the sun into the thermally cold abyss of space. The north and south panels, however, face space during the entire orbit and generally receive relatively little solar energy input and so are advantageously used as the principal thermal radiating surfaces of the spacecraft.

Conventionally, the north and south panels are designed to be effective radiators to space, whereas the other panels are insulated so that they will not absorb thermal energy from the sun; therefore, they cannot radiate energy at other times. Such an arrangement is shown in U.S. Pat. No. 3,749,156 (Fletcher et al.) which discloses a thermal control system for a spacecraft modular housing wherein north and south oriented walls are designed to facilitate controlled transfer of heat from the interior of the module to space. The three sides that are subject to direct exposure to the sun's rays during orbital flight are constructed in a manner containing superinsulating material to prevent the transfer of heat therethrough. All significant heat transfer is through the north-south walls. The preferred coating for north and south walls is an optical solar reflector; multilayer, coated thin films (Mylar ® or Kapton ® films) are preferred superinsulating materials for the other walls. A heat pipe system within the module provides a rapid and efficient means of transferring heat to the north-south walls as well as uniformly across those walls.

An arrangement of like design is French Pat. No. 2 463 058 (Dornier System) which describes an installation for heat removal and temperature stabilization in which heat $PV_1$ (where $PV_n$ apparently is used as a designation for heat) from a component on the earth panel is carried by one or several heat pipes to the north radiator or to the south radiator or to both. The north and south radiators include several heat pipes and are "subject to the variable action of the sun." "If the surfaces of the North and South radiators of a spacecraft do not suffice for the removal of $PV_1 \ldots PV_3$, one must use for this removal one or several additional radiators. This result can be arrived at on the earth panel itself or by radiators on the West or East side." (Page 4, last paragraph.)

Both of these conventional arrangements have the same disadvantages as the aforementioned Nakamura et al. system in that a complex, expensive, and heavy network of internal thermally conductive heat pipes is required to transfer heat from one panel to another panel.

SUMMARY OF THE INVENTION

In a spacecraft adapted for orbiting a body illuminated by a sun, the spacecraft comprises a plurality of external panels at least first and second of which are oppositely disposed on said spacecraft in locations not subject to substantial illumination by said sun, and at least third and fourth of said panels are oppositely disposed on said spacecraft and receive illumination from said sun in different portions of the orbiting of said spacecraft about said body. The thermal control arrangement therefor comprises the first and second panels each having external surfaces having a solar absorptivity substantially lower than its thermal emissivity, and the third and fourth panels also each having external surfaces having a solar absorptivity substantially lower than its thermal emissivity. The first, second, third and fourth panels each have surfaces internal to said spacecraft that are adapted to radiate thermal energy between and among the panels.

IN THE DRAWING

Figure 1:
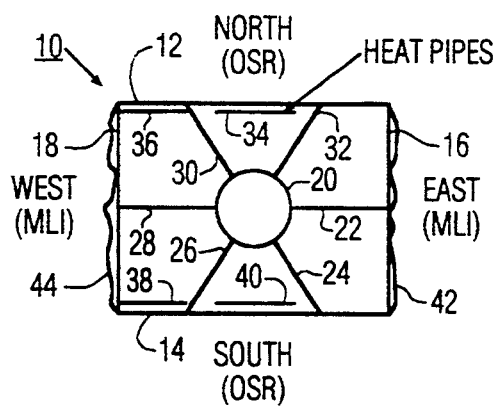
FIG. 1 is a diagram of a prior art spacecraft.

The prior art spacecraft 10 of FIG. 1 is viewed from the anti-earth side with the anti-earth panel removed. This spacecraft avoids the problems of the other prior art spacecraft described above and provides satisfactory spacecraft thermal control and management for low and medium power communications spacecrafts operating in geosynchronous earth orbit. Spacecraft 10 includes north panel 12, south panel 14, east panel 16, and west panel 18. Interior to the spacecraft is a cylindrical central support column 20 and radially mounted support panels 22, 24, 26, 28, 30, and 32 on which equipment may be mounted. Because north and south panels 12 and 14 face into space and can therefore be effectively utilized as heat radiating surfaces, it is advantageous to mount equipment that dissipates substantial energy (thus producing substantial heat) directly thereon where it can be conveniently and effectively thermally radiated into space. North and south panels 12 and 14 include heat pipes 34 and 36, and 38 and 40, respectively, for spreading the heat generated by the items of equipment mounted on those panels over respective substantial portions of the areas thereof. It is noted that although heat pipes 34, 36, 38, and 40 are diagrammatically shown spaced apart from the panels 12 and 14 for illustrative purposes, they are, in fact, embedded within the panels and in intimate thermal contact with the equipment and the radiators thereon. North and south panels 12 and 14 are covered on their outer surfaces with optical solar reflectors (OSRs), also known as optical surface radiators or second surface mirrors, which are thermal control coatings (described in more detail below) which serve as efficient thermal radiators. East and west panels 16 and 18 are covered with multilayer insulating (MLI) blankets 42 and 44, respectively, which reduce the thermal energy absorbed by such panels from the sun to an insignificant amount and which likewise reduce the amount of thermal energy radiated from the east and west panels.

Because the arrangement of FIG. 1 only utilizes a portion of the available surfaces of only the north and south panels to radiate excess heat to space, and because the internal structural elements comprising the central support cylinder and radial equipment panels are generally inefficient to transfer heat among the panels 12, 14, 16, and 18 by conduction, and would be inefficient to transfer heat among such panels by radiative coupling even if other radiating surfaces were available, this arrangement is less well suited to spacecraft employing higher power dissipating equipment.

Accordingly, there is a need for a thermal control arrangement for a spacecraft which can provide the greater thermal radiating surface area required by higher power payloads while avoiding the undesirable complexity, excess weight, and high cost of the arrangements disclosed in the prior art patent documents.

Figure 2:
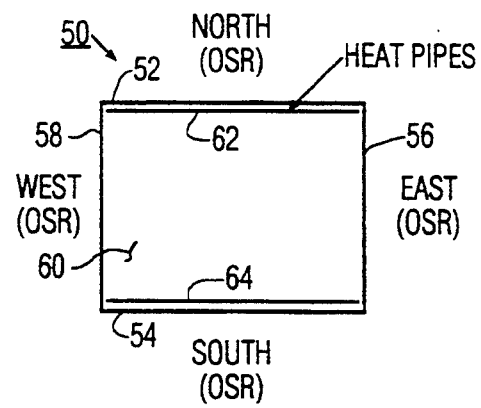
FIGS. 2 and 4 are diagrams of a spacecraft according to the present invention.

In FIG. 2, spacecraft 50, viewed in like manner to that of FIG. 1, has north and south payload panels 52 and 54, each of which includes a network of embedded heat pipes 62 and 64, respectively, which spread the heat load generated by equipment (not shown) mounted on such panel substantially over the entire panel area. In a communications satellite of the sort suitable for operation in geosynchronous earth orbit, the highest power dissipating equipment is the communications payloads, particularly the transmitting equipment. This equipment is preferably mounted on the north and south panels. North and south panels 52 and 54 include an external thermal control surfaces comprising optical solar reflectors. East and west panels 56 and 58 also have external thermal control surfaces comprising optical solar reflectors. These panels enclose an internal volume 60 of spacecraft 50 which is substantially free of structural or other elements impeding the radiation of thermal energy between and among the north, south, east and west panels 52, 54, 56, and 58. This inventive arrangement takes advantage of the fact that over a complete orbit, more thermal energy is lost via radiation from each of the east and west panels with optical solar reflectors than is gained by absorption of energy from the sun by such panels. Accordingly, the average temperature of the spacecraft will be lower with this inventive arrangement than with the prior art arrangement of FIG. 1, for spacecraft of equivalent physical size and internal power dissipation (heat generation).

Figure 3:
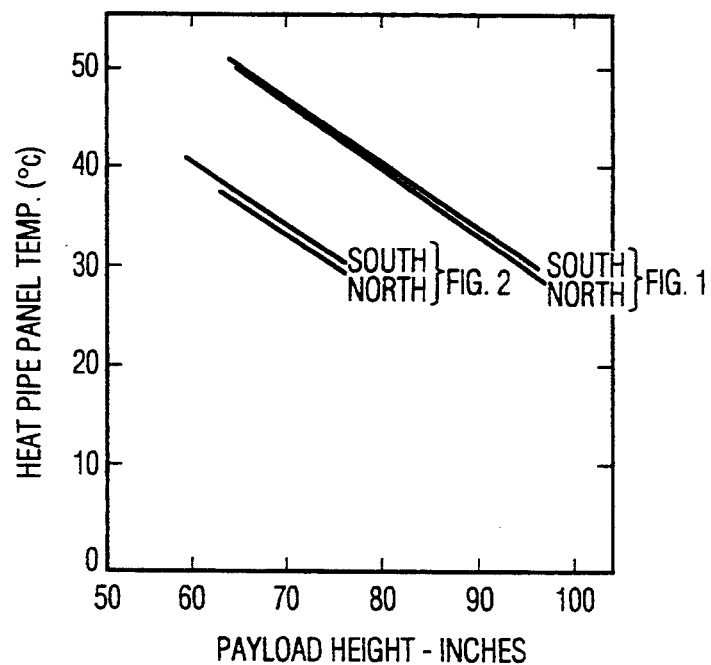
FIG. 3 is a graph showing relative performance of two types of thermal systems.

FIG. 3 is a graph comparing the thermal performance of the prior art spacecraft of FIG. 1 to that of the spacecraft of FIG. 2 embodying the present invention. This overall increase in heat rejection results because one of the east and west panels 56 and 58 is always able to radiate heat energy to the cold of space for substantially more than one-half of each orbit, while the solar energy absorbed on the other of these panels is minimized via the beneficial characteristics of the optical solar reflector (which is described below) as well as the fact that solar energy impinges thereon for substantially less than one-half of each orbit. The heat pipes 62 and 64 contribute to this increase by reducing the east-west thermal gradients on the north and south panels 52 and 54. The analysis used to produce these comparative parametric curves assumed two spacecraft according to the FIGS. 1 and 2, respectively, having identical electrical power dissipation on each of the panels thereof and equivalent characteristics for the optical solar reflectors thereon. The graph of FIG. 3 shows the dramatic advantage of the present invention. This advantage may be realized in a spacecraft as either a reduction in panel temperature for a predetermined area of the north and the south panels, or as reduced height (and therefore area) of the required payload radiator panels, as well as the potential for a somewhat lesser reduction of both the area and temperature of each, when employing the thermal control arrangement of the present invention. The slightly higher temperature on the south panel as compared to that on the north panel in each configuration reflects the seasonal variation of solar intensity. The analysis is for the winter season when the earth is closest to the sun thereby to produce the hottest spacecraft condition. Due to inclination of the equatorial orbital plane of the geosynchronous orbit with respect to the solar plane, the sun illuminates the south panel at a high angle of incidence which causes the payload equipment mounted on the south panel to operate at a slightly higher temperature as compared to that on the north, notwithstanding equal payload equipment power dissipation on each of those two panels.

Although it is preferred that the interior of spacecraft 50 be free of structure and other elements that impede thermal radiation, the present invention is suitable where such elements are employed even though some internal radiative advantage is reduced.

Thus, it is seen that the present invention provides more desirable thermal control characteristics for spacecraft having high power payloads than does that of the prior art arrangements. A spacecraft embodying the present invention further provides a dramatic reduction in spacecraft weight owing to the avoidance of the complex and heavy internal heat pipe transfer networks required by the prior art patents, the elimination of the internal structural elements of the prior-art, lower-power spacecraft, as well as that obtainable due to the reduced height (and therefore area) of the payload panels, as illustrated by FIG. 3.

Figure 4:
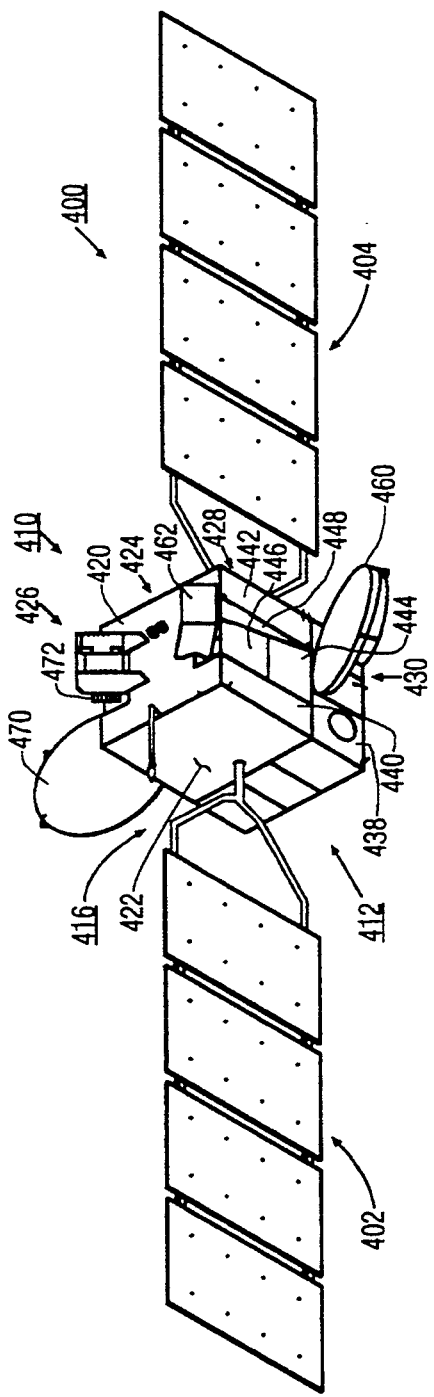

FIG. 4 is a diagram of a complete spacecraft 400 intended for communications spacecraft service in C-band and Ku-band from geosynchronous earth orbit. Spacecraft 400 comprises body 410 which is oriented in space so that panel 420 faces the earth throughout every orbit. Body 410 contains the required payload and housekeeping equipment. Extended outwardly from the north panel 422 and south panel 424 (not visible) of body 410 are solar cell arrays 402 and 404, each of which comprise four rectangular panels having solar cells mounted on one side thereof. These arrays 402 and 404 rotate about the axis defined by boom 406 with respect to spacecraft body 410 at a rate of one revolution per orbit so that the orientation of the solar cell sides of arrays 402 and 404 are facing the sun as the orientation of the earth-facing panel 420 of body 410 remains toward the earth. Housekeeping equipment, such as that for telemetry tracking and control systems, power systems, attitude control systems, and the like, are contained in the generally rectangular housekeeping module 412, the interior of which includes a central cylinder and six radial structural panels in arrangement similar to that shown for the prior art spacecraft of FIG. 1. U.S. Pat. Nos. 4,009,851, entitled "Spacecraft Structure" and 4,682,744, entitled "Spacecraft Structure" describing structures employing central support cylinders and radial panels are incorporated herein by reference. The payload equipment, such as communications receivers, communications transmitters, and communications antennas and the like, are arranged within a generally rectangular payload module 414. North panel 422 thereof is covered with an optical solar reflector as are substantial portions 440, 442, and 444 of the west panel 428 thereof and corresponding portions of the east panel 426 (not visible) thereof. Both the north and south payload panels 422 and 424 contain an arrangement of heat pipes therein, described below, for spreading the heat generated by equipment mounted thereon over a substantial portion thereof, for radiation into space. It is noted that while the west payload panel 428, as well as the east payload panel 426, could be generally planar, it may be convenient to provide a sloped section so that the Ku-band beam forming networks 462 may have a clear, unobstructed view of the Ku-band antenna reflector 460 for receiving and transmitting signals. In the sloped section, center subpanel 444 is covered with OSR as are the left and right subpanels 440 and 442, and center subpanel 446 and triangular panel 448 are covered with MLI. Likewise, a similar arrangement may be used on the east panel so that the C-band feed horn assemblies 472 may have a clear, unobstructed view of the C-band antenna reflector 470. Alternatively, the entire east and west payload panels 426 and 428 could be sloped as are the central portions 444 and 446 thereof in FIG. 4. Deployable omnidirectional antenna 408 provides reception and transmission of signals for command, ranging, tracking and telemetry functions.

The foregoing arrangement cooperates with other thermal control features of spacecraft 400 pertaining to thermal control. Earth-facing panel 420 and anti-earth panel 430 are both covered with multilayer insulation as are substantial portions of the surfaces of housekeeping module 412. Both Ku-band antenna reflector 460 and C-band antenna reflector 470 are covered on their front faces by reflective membranes and on their rear surfaces by multilayer insulation. Ku-band beam forming network 462 has optical solar reflectors on its north and south surfaces and is otherwise covered with multilayer insulation. C-band feed horn assembly 472 is covered with a tent made of multilayer insulation material.

Figure 5:
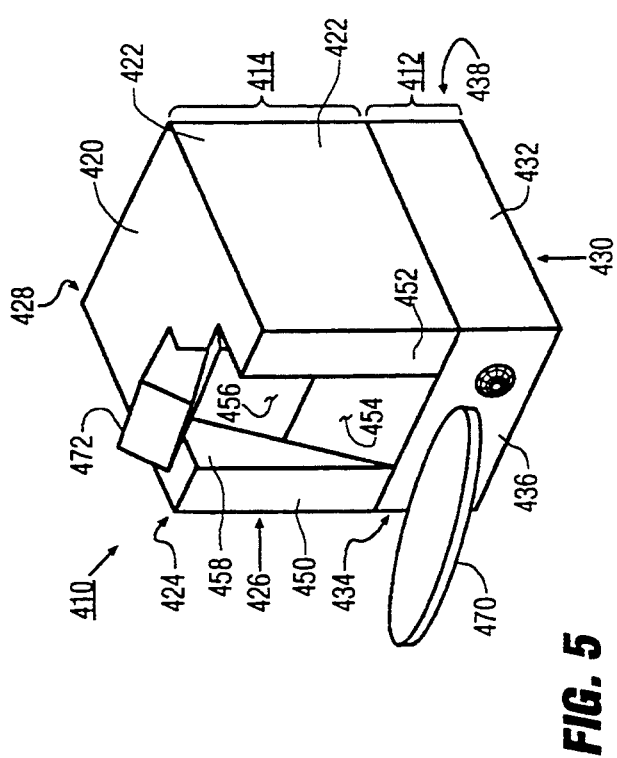

FIG. 5 is a diagram of spacecraft body 410 having each surface thereon divided into subsections for showing further detail of the thermal control surfaces thereon. Earth-facing panel 420 and anti-earth panel 430 (not visible) are covered with multilayer insulating material as are the east panel 436 and west panel 438 (not visible) of the housekeeping module 412. North payload panel 422 and south payload panel 424 (not visible) of payload module 414 are panels containing embedded heat pipes (described below) and are covered on their external surface with optical solar reflectors.

An optical solar reflector is a thin transparent cover which is coated by a highly reflective material. Fused silica OSRs available from Optical Coating Laboratory, Inc. (OCLI) of Santa Rosa, Calif. are about 6 mils thick and are covered with a deposited silver coating on the side that is bonded to the spacecraft and with an indium tin oxide conductive coating on the exposed surface. CMX glass OSRs available from Pilkington Space Technology of Bodelwyddan, Rhyl, Clwyd, United Kingdom, are about 3 mils thick and have a deposited silver coating on the side that is bonded to the spacecraft and an indium tin oxide conductive coating on the surface exposed to space. Both are available in 1.65 inch by 1.65 inch squares and have solar absorptivity $\alpha$ of about 0.08 to 0.10 and thermal emissivity $\epsilon$ of about 0.80 to 0.81. The low ratio of absorptivity to emissivity $\alpha/\epsilon$ is indicative of the fact that the OSR is a very efficient radiator of thermal energy in the infrared band in which thermal energy is principally radiated and has a low thermal absorptivity in the band in which energy contained in solar illumination is found. Protection against electrostatic discharge of plasma-induced electrostatic charge on the spacecraft is provided by the front to back surface resistance of about 200K $\Omega$ of the OSR in combination with the conductive indium oxide or indium tin oxide coatings on one surface thereof, the silver coating on the other surface thereof and their being bonded and bounded with an adhesive that is not an electrical insulator, such as Solithane ® 113 adhesive (with carbon black filler) available from Morton-Thiokol, Inc., Morton Chemical Division of Chicago, Ill., or RTV 566 adhesive available from General Electric Company of Waterford, N.Y., or a mixture of RTV 566 and RTV 567 adhesives (with graphite fiber filler).

Although it is desirable that the external coating material have an $\alpha$ as close to zero as possible and an $\epsilon$ as close to one as possible, the invention may be advantageously employed with substantially different values, for example, $\alpha \approx 0.4$ and $\epsilon \approx 0.6$, as might be obtained from a thermal control paint that has experienced degradation by exposure to ultraviolet (UV) and ionizing radiation.

East payload panel 426 and west payload panel 428 (not visible in FIG. 5 but shown in FIG. 4) employ similar thermal control surfaces. Left and right east payload subpanels 450 and 452 (also sometimes referred to as the southeast and northeast subpanels) (and their west panel counterparts 440 and 442) are covered with optical solar reflectors of the sort previously described. Subpanel 454 of the center slant surface is also covered with such OSR while subpanel 456 thereof is covered with MLI for minimized reflections of thermal energy into the C-band feed horn assembly 472. The triangular section 458 and its three counterparts (not visible) on the east and west payload panels 426 and 428 are also covered with MLI.

The interior surfaces of panels 420, 422, 424, 426, and 428 are covered with a thermal control paint, such as Chemglaze Z306 black paint or MH21S/LO black paint available from Lord Corporation of Erie, Pa. or from Illinois Institute of Technology Research of Chicago, Ill., respectively, except where equipment is mounted thereto. A compound enhancing thermal conductivity between the various items of equipment mounted to the panel and the inner face sheet of the panel is employed to improve the thermal conductivity therebetween. RTV 566 available from General Electric Company of Waterford, N.Y. may be used for such purpose.

Housekeeping module 412 includes optical solar reflectors on its north panel 432 and south panel 434 (not visible) and MLI on its east panel 436 and the west panel 438 (not visible) in the manner similar to that described for the prior art spacecraft shown in FIG. 1. Equipment within the housekeeping module that dissipates the highest power such as elements of the power subsystem such as batteries, are preferentially mounted on the north and south housekeeping panels 432 and 434.

Figure 6:
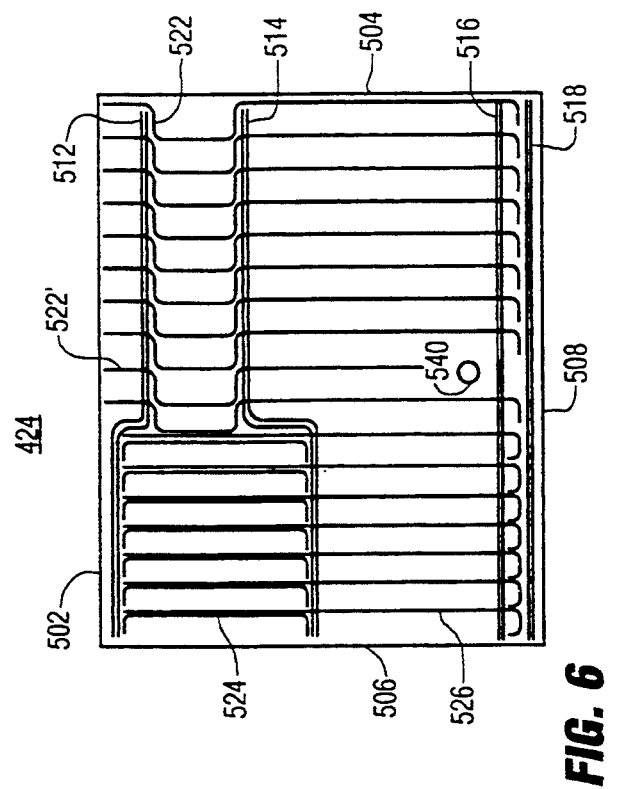
FIGS. 5 and 6 are diagrams representing portions of the spacecraft of FIG. 4.

FIG. 6 is a diagram representing details of the south payload transponder panel 424 which contains a network of heat pipes embedded therein so that the heat dissipated by equipment mounted thereon is relatively uniformly dispersed over substantially the entire area of panel 424. Panel 424 comprises a honeycomb panel having embedded between two face sheets, in areas from which the aluminum honeycomb is not placed, an arrangement of a variety of differently shaped heat pipes. On panel 424, the payload equipment dissipating the highest power and thereby generating the greatest heat is generally located in the upper half of the panel (i.e. the half closest to edge 502 which abuts the earth-facing panel 420). Right hand edge 504 abuts the west payload panel 428 while left hand edge 506 abuts the east payload panel 426. Bottom edge 508 abuts the upper edge of the south panel 434 of housekeeping module 412.

Diagrammatically in FIG. 6, panel 424 is shown with one of the two aluminum face sheets removed and with the spacing between heat pipes exaggerated so that the specific shape of each particular heat pipe and the layout of the heat pipes may be seen. Panels 424 and 422 are about 0.95 inches thick and employ 8 mil thick aluminum alloy face sheets for both the surface interior to the spacecraft and for the surface external to the spacecraft. An aluminum alloy honeycomb foil available from Hexcel Corporation located in Dublin, Calif. is employed as the core of the panel to which the face sheets are bonded. Other panels of spacecraft body 410 may be thicker or thinner or employ heavier or lighter gauge face sheets depending on whether the equipment mounted thereon has either a higher or lower mass or a higher or lower power dissipation. Panels 450 and 452 are about ½ inch thick and employ 5 mil thick face sheets over a honeycomb core, and panels 454 and 456 are about 1 inch thick and employ 7 mil face sheets over a honeycomb core.

A plurality of differently shaped heat pipes conduct heat along the panel 424 between the earth-facing panel and the housekeeping module (i.e. vertically in FIG. 6) to reach the transverse spreader heat pipes 512, 514, 516 and 518 described below. These vertical heat pipes include ten heat pipes 522 having an S-like shape, one of which 522' is truncated so as not to block hole 540 through which the boom 406 for solar arrays 402 and 404 passes. The S-shaped heat pipes 522 underlie a plurality of Ku-band traveling wave-tube amplifiers (TWTAs) mounted on the upper right-hand quadrant of panel 424. Closer to the east edge 506 of panel 424, seven heat pipes 524 having a C-like shape and seven heat pipes 486 having a J-like shape conduct heat between edges 502 and 508 to reach the transverse spreader heat pipes 512, 514, 516, and 518. The C-shaped heat pipes 524 and the upper end of the long portion of J-shaped heat pipes 526 underlie a plurality of C-band solid-state power amplifiers (SSPAs) mounted in the upper left-hand quadrant of panel 424. These 24 vertical heat pipes are mounted closer to the interior face sheet of panel 424 to which equipment is mounted than to the exterior face sheet thereof which is covered by OSRs.

A plurality of transversely-oriented heat pipes run laterally between the east and west edges 506 and 504 and perpendicularly to the C-, J-, and S-shaped heat pipes 524, 526, 522 described above. These transverse heat pipes comprise a group of two header heat pipes 512 having a relatively shallow Z shape, a group of two header heat pipes 514 having a relatively deep Z shape, and four straight header heat pipes arranged in groups of two, 516 and 518, relatively close to bottom edge 508. These eight heat pipes serve to conduct heat transversely from east to west not only spreading the heat generated on payload panel 424 but tending to conduct that heat more closely to whichever one of the east and west panels is coolest. These eight heat pipes are mounted closer to the exterior face sheet of panel 424 covered by OSRs than to the interior face sheet thereof to which equipment is mounted.

The heat pipes in the network just described span substantially the entire dimension of the panel between the east and west edges 506 and 504 and between the earth and housekeeping edges 502 and 508 of payload panel 424, thereby to spread the heat generated by the payload equipment, principally the Ku-band TWTAs and the C-band SSPAs, substantially uniformly thereover, i.e. to minimize temperature gradients.

Each of the heat pipes described in the preceding paragraphs is axially-grooved, constant-conductance, aluminum heat pipe employing an ammonia working fluid, of the type previously qualified and employed on many spacecraft such as ATS-II. These heat pipes are commercially available from OAO Corporation, a corporation located in Greenbelt, Md. and from Dynatherm Corporation located in Cockeysville, Md. The interior grooved bore of the aluminum heat pipe is generally circular in cross-section whereas the external walls thereof include at least one flattened portion for better making thermal contact with the face sheets of panels 422 and 424 as well as with the other heat pipes within such panels with which they intersect and must transfer heat.

Although the foregoing describes the preferred embodiment of the present invention, modifications thereto and variations thereof will be apparent to one of ordinary skill in the art based on the descriptions and teachings herein. Applicant's invention includes such modifications and variations and is limited only by the scope of the claims below.

What is claimed is:

1. A thermal control arrangement for a spacecraft adapted for orbiting a body illuminated by a sun, said spacecraft comprising a plurality of external panels at least first and second of which are oppositely disposed on said spacecraft in locations not subject to substantial illumination by said sun, and at least third and fourth of said panels are oppositely disposed on said spacecraft and receive illumination from said sun in different portions of the orbiting of said spacecraft about said body, at least one of said first and second external panels including means for conducting heat therethrough in a manner for reducing temperature differences over substantially the entire area of said panel, said first and second panels each having external surfaces having a solar absorptivity substantially lower than its thermal emissivity, said third and fourth panels each having external surfaces having a solar absorptivity substantially lower than its thermal emissivity, and wherein said first, second, third and fourth panels have surfaces internal to said spacecraft adapted to radiate thermal energy therebetween.

2. The arrangement of claim 1 wherein said means for conducting heat includes a plurality of heat conducting devices within said one panel arranged for conducting heat over substantially the entire area of said one panel in said manner for reducing temperature differences over said one panel.

3. The arrangement of claim 2 wherein a first group of said heat conducting devices is arranged to conduct heat in a first direction and a second group of said heat conducting devices is arranged to conduct heat in a second direction transverse to said first direction.

4. The arrangement of claim 1 wherein the external surfaces of said first, second, third and fourth panels include optical solar reflectors.

5. A thermal control arrangement for a spacecraft adapted for orbiting a body illuminated by a sun, said spacecraft comprising a plurality of external panels at least first and second of which are oppositely disposed on said spacecraft in locations not subject to substantial illumination by said sun, and at least third and fourth of said panels are oppositely disposed on said spacecraft and receive illumination from said sun in different portions of the orbiting of said spacecraft about said body, said first and second panels each having external surfaces having a solar absorptivity substantially lower than its thermal emissivity, said third and fourth panels each having external surfaces having a solar absorptivity substantially lower than its thermal emissivity, and wherein said first, second, third and fourth panels have surfaces internal to said spacecraft adapted to radiate thermal energy therebetween without interference from substantial intervening structural elements of said spacecraft.

6. The arrangement of claim 5 wherein at least one of said first and second external panels includes means for conducting heat therethrough in a manner for reducing temperature differences over said panel.

7. The arrangement of claim 6 wherein said means for conducting heat includes a plurality of heat conducting devices within said one panel arranged for conducting heat over substantially the entire area of said one panel in said manner for reducing temperature differences over said one panel.

8. The arrangement of claim 7 wherein a first group of said heat conducting devices is arranged to conduct heat in a first direction and a second group of said heat conducting devices is arranged to conduct heat in a second direction transverse to said first direction.

9. The arrangement of claim 5 wherein the external surfaces of said first, second, third and fourth panels include optical solar reflectors.

10. A spacecraft adapted for operation in a low inclination angle earth orbit comprising:
north, south, east and west panels defining a spacecraft interior volume, said north and south panels being oppositely disposed with respect to each other and said east and west panels being oppositely disposed with respect to each other;
said north and south panels each including respective means for conducting heat thereacross for reducing the temperature differences on each of said panels;
a source of electrical energy;
utilization means mounted on interior surfaces of at least one of said north and south panels, wherein said utilization means dissipate at least a portion of said electrical energy;
said north, south, east and west panels having means covering surfaces thereof exterior to said spacecraft for radiating thermal energy therefrom, said means having a solar absorptivity that is substantially less than its thermal emissivity;

said north, south, east and west panels further having means covering surfaces thereof interior to said spacecraft for effectively radiating thermal energy between and among said north, south, east and west panels across said interior volume.

11. The spacecraft of claim 10 wherein said means for conducting heat includes a plurality of heat conducting devices within said one panel arranged for conducting heat over substantially the entire area of said one surface for reducing temperature differences over said panel.

12. The spacecraft of claim 11 wherein a first group of said heat conducting devices is arranged to conduct heat in a first direction and a second group of said heat conducting devices is arranged to conduct heat in a second direction transverse to said first direction.

13. The spacecraft of claim 10 wherein said north, south, east and west panels include optical solar reflectors.

14. The spacecraft of claim 10 wherein said orbit is equatorial.

15. The spacecraft of claim 14 wherein said orbit is equatorial at geosynchronous altitude.

16. The spacecraft of claim 10 wherein said spacecraft interior volume lacks structural elements that substantially restrict thermal radiation among said north, south, east and west panels.

* * * * *

UNITED STATES PATENT AND TRADEMARK OFFICE
CERTIFICATE OF CORRECTION

PATENT NO. : 5,372,183

DATED : December 13, 1994

INVENTOR(S) : Harold Paul Strickberger

It is certified that error appears in the above-identified patent and that said Letters Patent is hereby corrected as shown below:

Column 9, line 49, after "second" insert --ones--.

Column 9, line 49, after "which" insert --panels--.

Column 9, line 51, after "fourth" insert --ones--.

Column 9, line 66, delete "therebetween." and insert --between and among said first, second, third and fourth panels.--

Column 10, line 16, after "second" insert --ones--.

Column 10, line 16, after "which" insert --panels--.

Column 10, line 18, after "fourth" insert --ones--.

Column 10, line 29, delete "therebetween" and insert --between and among said first, second, third and fourth panels--.

Signed and Sealed this

Twenty-eight Day of March, 1995

Attest:

BRUCE LEHMAN

*Attesting Officer*    *Commissioner of Patents and Trademarks*